(12) United States Patent
Stefes et al.

(10) Patent No.: US 10,279,894 B2
(45) Date of Patent: May 7, 2019

(54) VORTEX GENERATOR ARRANGEMENT, FLOW CONTROL SYSTEM AND METHOD FOR CONTROLLING A FLOW ON A RUDDER SURFACE

(71) Applicant: Airbus Operations GmbH, Hamburg (DE)

(72) Inventors: Bruno Stefes, Hamburg (DE); Wolfgang Eilken, Hamburg (DE); Erich Paul, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 175 days.

(21) Appl. No.: 15/274,197

(22) Filed: Sep. 23, 2016

(65) Prior Publication Data

US 2017/0096214 A1    Apr. 6, 2017

(30) Foreign Application Priority Data

Oct. 1, 2015   (EP) .................................... 15187918

(51) Int. Cl.
*B64C 23/06* (2006.01)
*B64C 9/02* (2006.01)
(Continued)

(52) U.S. Cl.
CPC ................. *B64C 23/06* (2013.01); *B64C 5/06* (2013.01); *B64C 9/02* (2013.01); *B64C 13/16* (2013.01); *Y02T 50/162* (2013.01)

(58) Field of Classification Search
CPC .. B64C 23/06; B64C 5/06; B64C 9/02; B64C 13/16; B64C 14/00
(Continued)

(56) References Cited

U.S. PATENT DOCUMENTS 2,852,209 A * 9/1958 Petre ........................ B64C 13/00
                                                244/213
4,039,161 A * 8/1977 Bauer ....................... B64C 23/06
                                                 138/39
(Continued)

FOREIGN PATENT DOCUMENTS

EP    2441669    4/2012
EP    2801521    11/2014

OTHER PUBLICATIONS

Extended European Search Report for Application No. 15187918 dated Mar. 16, 2016.

*Primary Examiner* — Timothy D Collins
*Assistant Examiner* — Tye William Abell
(74) *Attorney, Agent, or Firm* — Jenkins, Wilson, Taylor & Hunt, P.A.

(57) ABSTRACT

A vortex generator arrangement for an aircraft comprising a surface section forming a flow surface interacting with a flow surrounding the aircraft in operation, wherein the surface section comprises an opening, a vortex generator movable between a retracted position and an extended position, a retainer for holding the vortex generator in the retracted position, a biasing structure for biasing the vortex generator towards the extended position and a release for releasing the vortex generator from the retainer such that the vortex generator can be moved towards the extended position. Further, a sealing membrane is provided completely sealing the opening when the vortex generator is in the retracted position. The vortex generator is movable through the membrane from the retracted position to the extended position. Furthermore, a flow control system, an aircraft and a method of controlling flow are described and claimed.

12 Claims, 2 Drawing Sheets

(51) Int. Cl.
*B64C 13/16* (2006.01)
*B64C 5/06* (2006.01)

(58) Field of Classification Search
USPC .......................................................... 277/917
See application file for complete search history.

(56) References Cited

U.S. PATENT DOCUMENTS

| | | | | |
|---|---|---|---|---|
| 4,142,371 A * | 3/1979 | Mayfield | ............. | E02B 17/0013 138/89 |
| 4,258,889 A * | 3/1981 | Hunt | ....................... | B64C 21/06 156/293 |
| 5,755,408 A * | 5/1998 | Schmidt | ................. | B64C 21/00 244/130 |
| 6,105,904 A * | 8/2000 | Lisy | ......................... | B64C 3/58 244/130 |
| 7,878,457 B2 * | 2/2011 | Narramore | ............. | B64C 23/06 244/200.1 |
| 2004/0129838 A1 * | 7/2004 | Lisy | ....................... | B64C 23/06 244/204.1 |
| 2009/0120205 A1 * | 5/2009 | Clingman | ............... | B64C 23/06 73/861.22 |
| 2010/0038492 A1 * | 2/2010 | Sclafani | .................... | B64C 7/02 244/199.1 |
| 2012/0091266 A1 * | 4/2012 | Whalen | ..................... | B64C 5/06 244/87 |
| 2014/0331665 A1 * | 11/2014 | Shivashankara | .......... | B64C 9/32 60/527 |
| 2015/0090356 A1 * | 4/2015 | Clingman | ............... | F15D 1/009 137/808 |
| 2016/0031550 A1 * | 2/2016 | Harrison | ............... | B64C 1/0009 244/199.1 |
| 2016/0176531 A1 * | 6/2016 | Biehl | .................. | B64D 17/025 244/151 R |
| 2016/0229520 A1 * | 8/2016 | Tiryaki | ..................... | B64C 9/02 |
| 2016/0229526 A1 * | 8/2016 | Hegenbart | ................ | B64C 9/02 |
| 2017/0152025 A1 * | 6/2017 | Stefes | ..................... | B64C 23/06 |

* cited by examiner

VORTEX GENERATOR ARRANGEMENT, FLOW CONTROL SYSTEM AND METHOD FOR CONTROLLING A FLOW ON A RUDDER SURFACE

CROSS-REFERENCE TO RELATED APPLICATION

This application claims priority to European Patent Application EP 15187918.6 filed Oct. 1, 2015, the entire disclosure of which is incorporated by reference herein.

TECHNICAL FIELD

The present disclosure relates to a vortex generator arrangement for an aircraft.

BACKGROUND

The vortex generator arrangement comprises a surface section forming a flow surface interacting with a flow surrounding the aircraft in operation. The surface section comprises an opening. The vortex generator arrangement further comprises a vortex generator movable between a retracted position and an extended position. In the extended position the vortex generator extends through the opening into the flow and in the retracted position the vortex generator does not extend through the opening into the flow. Furthermore, the vortex generator arrangement comprises a retainer for holding the vortex generator in the retracted position, a biasing structure for biasing the vortex generator towards the extended position and a release for releasing the vortex generator from the retainer such that the vortex generator can be moved towards the extended position. The disclosure herein further relates to a flow control system comprising a vertical tail plane for an aircraft and a control unit, an aircraft comprising a flow control system and a method of controlling the flow on a rudder surface of an aircraft.

The vertical tail plane of an aircraft and the vertical rudder mounted to the vertical tail plane mainly provide directional stability and yawing moment for rotating the aircraft about its vertical or yawing axis. The maximum yawing moment that can be generated by the rudder depends on the size of the vertical rudder and the degree by which the rudder can be deflected about a rudder axis. Simply speaking, more yawing moment can be generated with a larger rudder or a rudder that can be deflected by a greater angle. As the rudder can only be deflected by a limited angle to avoid a stall of the flow at the rudder, the maximum yawing moment is largely determined by the overall dimensions of the rudder.

As the maximum yawing moment is never required under regular operating conditions, most of the yawing moment that could be generated by the vertical rudder remains unused under regular operating conditions. In other words, most of the vertical tail only generates drag under regular operating conditions and is not required for controlling the aircraft. As drag increases, the fuel consumption increases, which reduces the maximum range of the aircraft, so therefore any unnecessary drag should be avoided.

SUMMARY

In view of the above it can be considered an object of the present disclosure to improve the flow by the vertical tail plane and the vertical rudder without having to increase the dimensions of the vertical tail plane.

A first aspect provides a vortex generator arrangement of the above kind further comprising a sealer completely sealing the opening when the vortex generator is in the retracted position. Furthermore, the sealer is adapted such that the vortex generator can permanently destroy the sealing of the opening by the sealer when moving from the retracted position to the extended position.

In other words, in a first aspect the present disclosure relates to a vortex generator arrangement which is provided for reducing the stall risk at the vertical tail plane and, in particular at the vertical rudder if the vertical rudder is deflected to generate the maximum available yawing moment. Thus, when the vortex generator arrangement according to the present disclosure is employed at a vertical tail plane, the overall dimensions of the vertical tail plane with the vortex generator arrangements can be reduced as a smaller dimensioned tail plane can create the same yawing moment as larger tail plane without the vortex generator arrangement according to the present disclosure. The vortex generator arrangement comprises a surface section which may, for example, form part of an outer surface or flow surface of a vertical stabilizer of an aircraft. The surface section comprises an opening through which a vortex generator, e.g., a blade, can move between a retracted position and an extended position. In the retracted position the vortex generator is arranged on that side of the surface section which is not subject to the flow surrounding an aircraft in which the vortex generator arrangement is used. The vortex generator can, for example, be arranged inside a vertical tail plane. Thus, in the retracted position the vortex generator does not affect the flow around the aircraft and creates, in particular, no additional drag. The vortex generator arrangement comprises a retainer which holds the vortex generator in the retracted position and prevents it from unintended movement to the extended position.

When the vortex generator arrangement's support is required, for example, for reducing the stall risk at the vertical rudder, the vortex generator can be moved through the opening in the surface section to the extended position in which it creates additional vortices which improve the flow at the vertical rudder. The movement between the retracted and the extended position can, for example, be a linear movement along a longitudinal direction or a rotational movement in which the vortex generator is rotated about a rotational axis. For moving the vortex generator from the retracted to the extended position a biasing structure, for example, in form of a spring is provided. The spring could, for example, be a coil spring for moving the vortex generator along a linear path or a torsion spring for rotating the vortex generator about an axis of rotation. Using a spring or another mechanical bias has the advantage of providing a particularly robust drive for moving the vortex generator between the retracted and the extended position as no external electrical or hydraulic power source is required.

To enable the movement of the vortex generator from the retracted to the extended position a release is provided which disconnects or releases the vortex generator from the retainer. The release can, for example, be an actuator moving the retainer from a first position in which it holds the vortex generator against the force exerted by the bias in the retracted position and a second position in which the bias does not hold the vortex generator in the retracted position anymore and enables a movement towards the extended position. The release and the bias do not necessarily have to be distinct units or elements.

Finally, the vortex generator arrangement comprises a sealer for sealing the opening in the surface section when the vortex generator is in the retracted position. The sealer may be provided by a membrane. The sealer advantageously prevents that any flow and any other environmental influences such as water or dirt may enter the interior of the vortex generator arrangement. To this end, the sealer is preferably formed in a single piece adhered permanently to an edge of the surface section surrounding the opening. The sealer further advantageously eliminates the additional drag that would be created by the opening in the surface section if the opening would remain uncovered.

The sealer is further designed to be destroyed or at least permanently detached from vortex generator assembly by the vortex generator when the vortex generator moves through the opening from the retracted position to the extended position. The vortex generator may, for example, cut the sealer or sealing membrane in two or more pieces or push the sealer out of the opening.

Hence, once the vortex generator arrangement has been activated by moving the vortex generator to the extended position, it cannot simply be deactivated as at least the sealing provided by the sealer is permanently destroyed. Therefore, the vortex generator arrangement does not comprise any structure or means for moving the vortex generator back from the extended position to the retracted position. Once activated the vortex generator arrangement has to replaced or repaired by maintenance personal, for example, by restoring the sealer and manually moving the vortex generator back to the retracted position.

The vortex generator arrangement according to the present disclosure is only intended to be used in situations when maximum yawing moment is required. When extended, the vortex generator arrangement prevents stalling of the vertical rudder such that the vertical rudder can be deflected further than under regular operating conditions. Advantageously, the vortex generator only generates additional drag once it has been activated. The amount of additional drag is, however, not very high such that the aircraft can be operated without constraints even when the vortex generator arrangement has been activated. Thus, if one or more of the vortex generator arrangements according to the present disclosure should be activated unintentionally, the aircraft may continue its regular operation and the vortex generator arrangements do not have to be replaced or repaired immediately.

As the opening is completely sealed from the environment by a sealer that will be destroyed or removed when the vortex generator is extended, the interior of the vortex generator arrangement and, in particular, the biasing structure, the retainer and the release are reliably secured against any environmental influences such as water or dirt. Thus, a reliable and low maintenance operation of the vortex generator arrangement according to the present disclosure is provided.

In a preferred embodiment the sealer is a sealing membrane that is destroyable by the vortex generator when the vortex generator moves from the retracted to the extended position. The sealing membrane can, for example, be adapted to be cut into two or more pieces by the vortex generator or burst into a plurality of pieces when hit by the vortex generator moving from the retracted to the extended position.

Alternatively or additionally the sealing membrane or sealer is preferably detachable from the vortex generator arrangement by the vortex generator when the vortex generator moves from the retracted to the extended position. The sealing membrane can, for example, be attached to the surface section by a pressure fit and the retaining force of this pressure fit is weaker than the force exerted by the vortex generator on the sealing membrane when moving towards the extended position. The sealing membrane would then simply be pushed away from the opening by the vortex generator. Alternatively or additionally, the sealing membrane could be adhered to the surface section using an adhesive and the adhesive forces of the adhesive could be smaller than the force exerted by the vortex generator. The sealing membrane would then simply detach from the surface section surrounding the opening. Combinations of a pressure fit and an adhesive are also possible. Also a combination of a sealing membrane that can be both destroyed or detached to ensure a reliable operation of the vortex generator arrangement are possible.

In an exemplary preferred embodiment the vortex generator is adapted such that the vortex generator only comes into pointwise contact with the sealer when the vortex generator moves from the retracted to the extended position. In other words, the vortex generator is shaped such that no extended contact is made between the sealer and the vortex generator but only in one or more point shaped locations. This advantageously improves the force locally introduced into the sealer and, therefore, the odds that the sealer is successfully destroyed by the vortex generator. The vortex generator can, for example, comprise a sharp blade facing the sealer in form of a sealing membrane which is preferably inclined with respect to a plane in which the sealing membrane extends such that localized contact is ensured. In other embodiments the vortex generator may have a toothed surface for cutting through the sealing membrane.

In a preferred embodiment the retainer is formed by a pin. The pin is adapted to prevent movement of vortex generator from the retracted position to the extended position when the pin is in a first position. The pin is movable from the first position to a second position by the release for releasing the vortex generator from the retainer, wherein in the second position the pin does not prevent movement of the vortex generator from the retracted to the extended position.

In an alternatively preferred embodiment the retainer is formed by a strap or wire and the release is provided in form of a pyrotechnic cutter adapted for cutting the strap or the wire for releasing the vortex generator from the retainer. Such pyrotechnic cutters have been found to be very reliable even under harsh operating conditions.

The vortex generator arrangement preferably comprises a housing, wherein the surface section and/or the sealer form an outer surface of the housing and wherein the vortex generator and at least one of the biasing structure, the retainer and the release are arranged inside the housing. A vortex generator arrangement provided in a single housing can advantageously be replaced in one piece for regular maintenance or for replacement or repair after activation which reduces the time and, therefore, the cost of maintenance or replacement. In some instances it may be advantageous to place the release outside the housing, for example, to facilitate maintenance of the release in form of a pyrotechnic cutter.

In a second aspect the problem is solved by a flow control system comprising a vertical tail plane for an aircraft and a control unit. The vertical tail plane comprises a vertical stabilizer, at least one rudder surface and a plurality of vortex generators according to any of the preceding embodiments, wherein the at least one rudder surface is deflectable about a rudder axis with respect to the vertical stabilizer and wherein the plurality of vortex generators is arranged on the vertical stabilizer and along the rudder axis, and wherein the control unit is adapted for actuating the release of the plurality of vortex generators such that the vortex generator of the plurality of vortex generators move from the retracted to the extended positions, wherein the control unit is adapted to only actuate the release when a deflection of the rudder about the rudder axis exceeds a predetermined value.

The predetermined value of rudder deflection is advantageously chosen such that it is only exceeded when the rudder is deflected beyond the maximum deflection during regular operation. As the maximum rudder deflection is limited by the aircraft's flight control system such maximum deflections may only occur on the ground at speeds below the minimum takeoff speed. Thus, if the predetermined value is set sufficiently high, unintended activation of the plurality of the vortex generator arrangements is prevented. However, if the vortex generator arrangements according to the present disclosure are activated, they advantageously reduce the distortion of the flow at the rudder and, thereby, increase the maximum angle about which the vertical rudder can be deflected without risking a stalling of the flow.

Further advantages of the flow control system correspond to the advantages of the vortex generator arrangements which the system comprises.

It is preferred if the control unit is further adapted to only actuate the release when a maximum available yawing moment is required. Such a situation can, for example, be detected by the flight control system of the aircraft and transmitted to a control unit of the flow control system. The control unit can, for example, be part of the aircraft's flight control system.

In an exemplary preferred embodiment the release is adapted to release the vortex generator if the control unit fails or if the release is disconnected from the control unit. Thereby, it is advantageously ensured that the vortex generator arrangement is always activated in. As the vortex generator in the extended position does not have considerable detrimental effects on the flight performance of the aircraft, an unintended activation of the vortex generator arrangement is preferred over the risk of a malfunctioning.

In a third aspect the problem is solved by an aircraft comprising a flow control system according to any of the preceding preferred embodiments. The advantages of the aircraft correspond to those of the flow control system used therein.

Finally, in a fourth aspect the problem is solved by a method of controlling the flow on a rudder surface of an aircraft comprising a vertical tail plane, wherein the vertical tail plane comprises a vertical stabilizer, at least one rudder surface and a plurality of vortex generators according to any of the preceding embodiments, wherein the at least one rudder surface is deflectable about a rudder axis with respect to the vertical stabilizer and wherein the plurality of vortex generators is arranged on the vertical stabilizer and along the rudder axis. The release of the plurality of vortex generators are actuated such that the vortex generator of the plurality of vortex generators move from their retracted to their extended positions only when a deflection of the at least one rudder surface is detected that exceeds a predetermined value.

In a preferred embodiment of the method the release are only actuated when it has been detected that a maximum available yawing moment is required.

Advantages of the method of controlling the flow on a rudder surface according to the present disclosure correspond to the advantages of the embodiments of the flow control system according to the present disclosure described in the preceding paragraphs having corresponding features and the advantages of the embodiments of vortex generator arrangements used in the method, respectively.

BRIEF DESCRIPTION OF THE DRAWINGS

In the following paragraphs exemplary embodiments of a vortex generator arrangement according to the present disclosure, a flow control system according to the present disclosure and a method of controlling the flow on a rudder surface will be described with reference to the Figures, wherein.

Throughout the Figures like references numerals will be used to indicate like elements.

DETAILED DESCRIPTION

Figure 1:
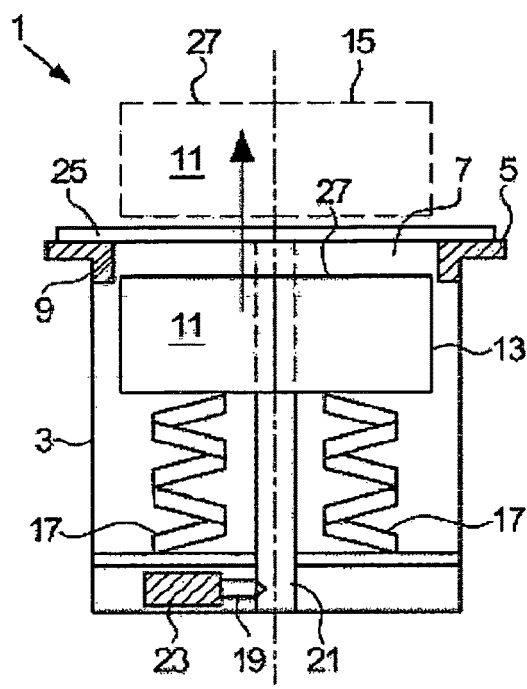
FIG. 1 shows a sectional view of a first exemplary embodiment of a vortex generator arrangement according to the present disclosure.

In FIG. 1 a first exemplary embodiment of a vortex generator arrangement 1 for an aircraft is shown. The vortex generator arrangement 1 comprises a housing 3. The housing 3 is at partially delimited by a surface section 5 which is adapted to form a flow surface interacting with the flow surrounding the aircraft when the aircraft is in flight. The housing 3 is preferably in the form of a circular or elliptical cylinder having circular or elliptical bases, respectively. One of the bases of the housing 3 is formed by the surface section 5.

The surface section 5 further comprises an opening 7 which is circumferentially surrounded by an edge 9 of the surface section 5. Through the opening 7 which may, for example, have a circular, elliptical or slit-like shape an interior of the housing 3 can be brought into fluid communication with the environment surrounding the vortex generator arrangement 1. In particular, flow impinging on the surface section 5 when the vortex generator arrangement 1 is in use could potentially flow into the interior of the housing 3.

The vortex generator arrangement 1 further comprises a vortex generator 11 in form of blade 11. The vortex generator 11 is movable between a retracted position 13 in which the vortex generator 11 is drawn with a solid line and an extended position 15 in which the vortex generator 11 is shown as a discontinuous line. In the retracted position 13 the vortex generator 11 is completely arranged inside the housing 3. Thus, it does not extend or protrude through the opening 7 to the outside of the housing 3. In particular, the vortex generator 11 does not affect any flow passing over the surface section 5. In the extended position the vortex generator 11 extends through the opening 7 into the flow passing over the surface section 5 and influences the flow by generating one or more vortices.

For moving the vortex generator 11 from the retracted position 13 to the extended position 15 a biasing structure 17 in form of two coil springs 17 is provided. The biasing structure 17 biases the vortex generator 11 towards the extended position 15. In other words, the biasing structure directly or indirectly exert a force onto the vortex generator 11 pushing the vortex generator 11 through the opening 7 and out of the housing.

To keep the vortex generator 11 in the retracted position 13 a retainer 19 is provided. In the exemplary embodiment shown in FIG. 1 the retainer 19 is formed by a pin 19 which is movable between a first position as shown in FIG. 1 in which the pin 19 engages with a shaft 21 supporting and guiding the vortex generator 11. The pin 19 can be moved by a release 23 in form of an actuator 23 to a second position in which the pin 19 does not engage with the shaft 21 anymore. The vortex generator 11 is, thus, released from the retainer 19 and moved by the biasing structure 17 from the retracted position 13 to the extended position 15.

The vortex generator arrangement 1 further comprises a sealer 25 in form of a sealing membrane 25 tightly sealing the opening 7 in the surface section when the vortex generator 11 is in the retracted position 13. The sealing membrane 25 can, for example, be adhered to the surface section 5 using an adhesive to provide a particularly tight sealing. Advantageously, the sealing membrane 25 completely seals the interior of the housing 3 from environmental influences such that water and dirt are prevented from entering the housing and do not harm the operability of the vortex generator arrangement. Furthermore, the sealing membrane 25 provides a flow surface in continuity of the surface section 5 and reduces the additional drag caused by the vortex generator arrangement. The sealing membrane 25 is preferably provided in a single piece.

Furthermore, the sealing membrane 25 is adapted such that the vortex generator 11 can permanently destroy the sealing of the opening 7 as provided by the sealing membrane 25 when it is pushed by the biasing structure 17 from the retracted position 13 to the extended position 15. To this end the vortex generator 11 may have a sharpened edge 27 for cutting the sealing membrane 25 in two or more parts. Alternatively, the sealing membrane 25 could be provided such that it scatters in a plurality of parts upon impact of the vortex generator 11. In other words, the vortex generator 11 moves from the retracted position 13 through the sealing membrane 25 into the extended position and destroys the sealing membrane 25 permanently.

Thus, the vortex generator arrangement 1 as shown in FIG. 1 is a single use vortex generator arrangement 1. Once the release 23 has released the vortex generator 11 from the retainer 19 the vortex generator 11 moves from the retracted position 13 to the extended position 15 and cannot be moved automatically back to the retracted position 13. As the vortex generator arrangement 1 is intended to be used as to energize the boundary layer only when the maximum achievable yawing moment is required, it does advantageously not affect the flow about an aircraft in which the vortex generator arrangement is used in regular operation. However, as the additional drag generated by an extended vortex generator 11 does not have a significant detrimental effect on the flight envelope, no means have to provided to move the vortex generator 11 back into the retracted position 13 once the vortex generator arrangement 1 has been activated. The vortex generator arrangement 1 is, therefore, considerably simpler than previously known extendable vortex generator arrangements which makes it more reliable.

Finally, as biasing structure is provided for moving the vortex generator 11 to the extended position 15, no external power source is required for actuating the vortex generator arrangement 1. The only external contact that is required is a signal to the release 23 such that the vortex generator 1 is released from the retainer 19.

Figure 2:
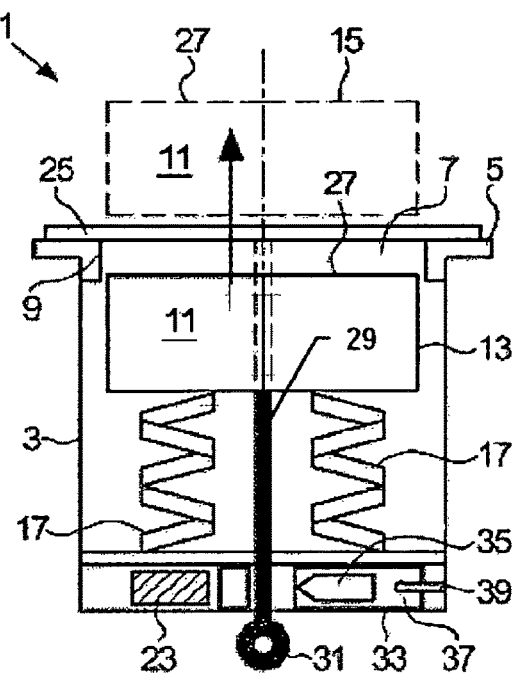
FIG. 2 shows a sectional view of a second exemplary embodiment of a vortex generator arrangement according to the present disclosure.

A second exemplary embodiment of a vortex generator arrangement 1 is shown in FIG. 2. The exemplary embodiment shown in FIG. 2 differs only in the employed retainer and release from the exemplary embodiment shown in FIG. 1. For the sake of brevity we will, therefore, refrain from repeating the above considerations and explanations that likewise apply to the exemplary embodiment shown in FIG. 2 and only discuss the differences.

The vortex generator arrangement 1 shown in FIG. 2 comprises a retainer 29 in form of a wire 29 which is rigidly attached to a mount 31 that forms part of the housing 3. In FIG. 2, the mount 31 is only shown schematically as a ring. Furthermore, a release 33 in form of a pyrotechnic cutter 33 is provided. The pyrotechnic cutter 33 comprises a piston 35, a propellant 37 and a detonator 39. For releasing the vortex generator 1, a signal is send to the detonator 39. The detonator 39 ignites the propellant 37 which accelerates the piston 35. The piston 39 then hits the wire 29 cutting it in two or more pieces thereby releasing the vortex generator 1 from the retainer 29. Such pyrotechnic cutters 33 have been found to be very reliable even under harsh operating conditions.

Figure 3:
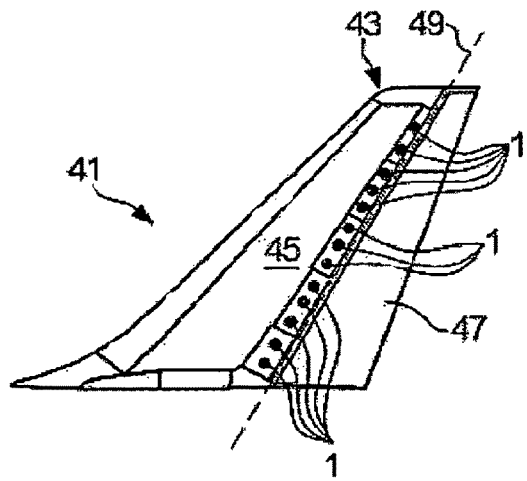
FIG. 3 shows a planar view of an exemplary embodiment of a flow control system according to the present disclosure.

FIG. 3 shows an exemplary embodiment of a flow control system 41 according to the present disclosure. The flow control system 41 comprises a vertical tail plane 43 and a control unit not shown in the Figures. The vertical tail plane 43 comprises a vertical stabilizer 45 and a vertical rudder or rudder surface 47. The rudder 47 can be deflected about a rudder axis 49 relative to the vertical stabilizer 45. The flow control system 41 further comprises a plurality of vortex generator arrangements 1 according to the present disclosure arranged on both sides of the vertical stabilizer 45 along the rudder axis 49. The vortex generator arrangements 1 can, for example, be vortex generator arrangements 1 as shown in FIG. 1 or 2.

The control unit of the flow control system 41 is adapted to monitor the deflection of the vertical rudder or rudder surface 47 about the rudder axis 49. If the deflection exceeds a predetermined value, the control unit activates the vortex generator arrangements 1 and, to be more precise, the release 23, 33 of the vortex generator arrangements 1 to release the vortex generator 11 from the retainer 19, 29. The vortex generator 11 are then pushed from the retracted position 13 to their respective extended positions 15 and influence the flow about the vertical tail unit 43. In particular, the vortex generator 11 improves the flow along the vertical rudder 47 such that the vertical rudder 47 can be deflected further about the rudder axis 49 without risking a stall of the flow. Thus, additional yawing moment can be provided.

Figure 4:
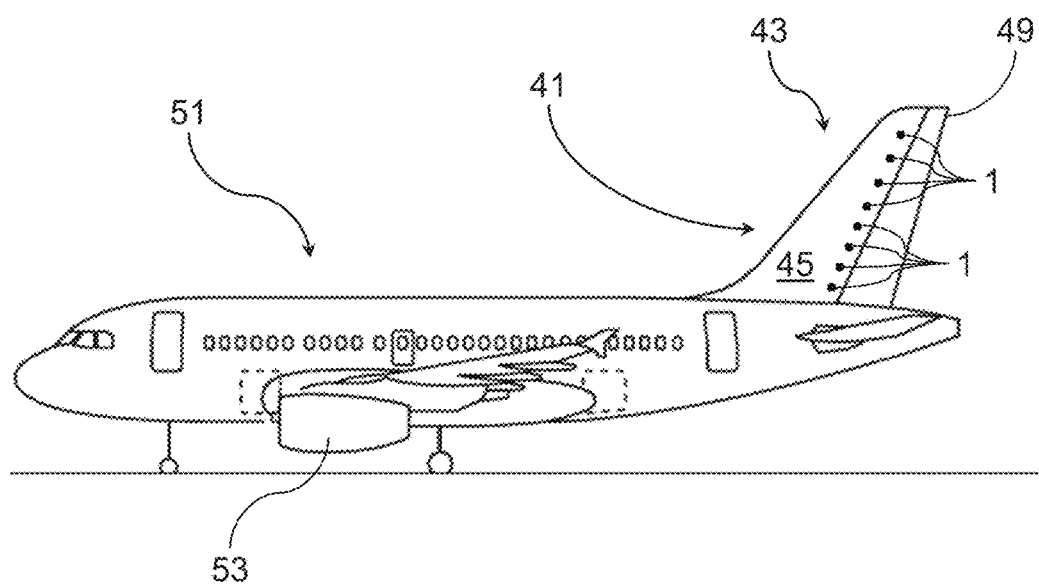
FIG. 4 shows a perspective view of an exemplary embodiment of an aircraft according to the present disclosure.

FIG. 4 shows an aircraft 51 according to the present disclosure comprising two engines 53 (only one can be seen in FIG. 4) and a vertical tail unit 43 which is part of a flow control system 41 as shown in FIG. 3. As the flow control system 41 of FIG. 3 is similar to the flow control system 41 used in the aircraft shown in FIG. 4, the preceding description of the flow control system 41 and its advantages applies vice versa to the aircraft 51 according to the present disclosure.

Finally, the flow control system 41 as shown in FIGS. 3 and 4 can be used to execute an exemplary embodiment of a method according to the present disclosure. The method includes the steps of determining a value by which the vertical rudder 47 has been deflected about the rudder axis 49 and only activating the vortex generator arrangements 1 when the value exceeds a predetermined value. In addition, the vortex generator arrangements 1 are only activated if it has additionally been detected that a maximum available yawing moment is required. The exemplary embodiment of a method according to the present disclosure shares the advantages of the flow control system 41.

While at least one exemplary embodiment of the present invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", an or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A vortex generator arrangement for an aircraft comprising:
    a surface section forming a flow surface interacting with a flow surrounding the aircraft in operation, wherein the surface section comprises an opening;
    a vortex generator movable between a retracted position and an extended position, wherein in the extended position the vortex generator extends through the opening into the flow and wherein in the retracted position the vortex generator does not extend through the opening into the flow;
    a retainer for holding the vortex generator in the retracted position;
    a biasing structure for biasing the vortex generator towards the extended position;
    a release for releasing the vortex generator from the retainer such that the vortex generator can be moved towards the extended position;
    a sealer completely sealing the opening when the vortex generator is in the retracted position; and
    wherein the sealer is adapted such that the vortex generator can permanently destroy the sealing of the opening by the sealer when moving from the retracted position to the extended position by being configured to cut the sealer in two or more pieces.

2. The vortex generator arrangement according to claim 1, wherein the sealer is destroyable by the vortex generator when the vortex generator moves from the retracted position to the extended position.

3. The vortex generator arrangement according to claim 1, wherein the sealer is a sealing membrane.

4. The vortex generator arrangement according to claim 1, wherein the biasing structure is in a form of a spring.

5. The vortex generator arrangement according to claim 1, wherein the retainer is formed by a pin,
    wherein the pin is adapted to prevent movement of vortex generator from the retracted position to the extended position when the pin is in a first position, and
    wherein the pin is movable from the first position to a second position by release for releasing the vortex generator from the retainer, wherein in the second position the pin does not prevent movement of the vortex generator from the retracted position to the extended position.

6. The vortex generator arrangement according to claim 1, wherein the retainer is formed by a strap or a wire, and wherein the release is provided in form of a pyrotechnic cutter adapted for cutting the strap or the wire for releasing the vortex generator from the retainer.

7. The vortex generator arrangement according to claim 1 comprising a housing, wherein the surface section and/or the sealer form an outer surface of the housing and wherein the vortex generator, the biasing structure, the retainer and the release are arranged inside the housing.

8. A flow control system comprising a vertical tail plane for an aircraft and a control unit,
    wherein the vertical tail plane comprises a vertical stabilizer, at least one rudder surface and a plurality of vortex generator arrangements, wherein the at least one rudder surface is deflectable about a rudder axis with respect to the vertical stabilizer and wherein the plurality of vortex generator arrangements is arranged on the vertical stabilizer and along the rudder axis, and
    wherein the control unit is adapted for actuating release of the plurality of vortex generator arrangements such that the vortex generator of the plurality of vortex generator arrangements move from their retracted positions to their extended positions, wherein the control unit is adapted to only actuate the release when a deflection of the rudder surface about the rudder axis exceeds a predetermined value,
    each of the vortex generator arrangements comprising:
    a surface section forming a flow surface interacting with a flow surrounding the aircraft in operation, wherein the surface section comprises an opening;
    a vortex generator movable between a retracted position and an extended position, wherein in the extended position the vortex generator extends through the opening into the flow and wherein in the retracted position the vortex generator does not extend through the opening into the flow;
    a retainer for holding the vortex generator in the retracted position;
    a biasing structure for biasing the vortex generator towards the extended position;
    a release for releasing the vortex generator from the retainer such that the vortex generator can be moved towards the extended position;
    a sealer completely sealing the opening when the vortex generator is in the retracted position; and
    wherein the sealer is adapted such that the vortex generator can permanently destroy the sealing of the opening by the sealer when moving from the retracted position to the extended position by being configured to cut the sealer in two or more pieces.

9. The flow control system according to claim 8, wherein the control unit is further adapted to only actuate the release when it has been detected that a maximum available yawing moment is required.

10. An aircraft comprising a flow control system according to claim 8.

11. A method of controlling a flow on a rudder surface of an aircraft comprising a vertical tail plane, wherein the vertical tail plane comprises a vertical stabilizer, at least one rudder surface and a plurality of vortex generator arrangements that each comprise:
    a surface section forming a flow surface interacting with a flow surrounding the aircraft in operation, wherein the surface section comprises an opening;
    a vortex generator movable between a retracted position and an extended position, wherein in the extended position the vortex generator extends through the opening into the flow and wherein in the retracted position the vortex generator does not extend through the opening into the flow, a retainer for holding the vortex generator in the retracted position;

a biasing structure for biasing the vortex generator towards the extended position;

a release for releasing the vortex generator from the retainer such that the vortex generator can be moved towards the extended position;

a sealer completely sealing the opening when the vortex generator is in the retracted position; and wherein the sealer is adapted such that the vortex generator can permanently destroy the sealing of the opening by the sealer when moving from the retracted position to the extended position by being configured to cut the sealer in two or more pieces;

wherein the method comprises deflecting at least one rudder surface about a rudder axis with respect to the vertical stabilizer and wherein the plurality of vortex generator arrangements is arranged on the vertical stabilizer and along the rudder axis; and wherein the method comprises actuating the release of the plurality of vortex generator arrangements such that the vortex generators of the plurality of vortex generator arrangements move from their retracted positions to their extended positions only when a deflection of the at least one rudder surface is detected that exceeds a predetermined value.

12. The method according to claim 11, wherein the releases are further only actuated when it has been detected that a maximum available yawing moment is required.

* * * * *